United States Patent [19]

Matsumura et al.

[11] Patent Number: 5,698,331
[45] Date of Patent: Dec. 16, 1997

[54] HYGROSCOPIC POLYESTER COPOLYMER, AND A HYGROSCOPIC FIBER MADE THEREFROM

[75] Inventors: Yoshitaka Matsumura; Yuko Harashina; Tetsunori Higuchi; Tai Sasamoto, all of Shizuoka, Japan

[73] Assignee: Toray Industries, Inc., Japan

[21] Appl. No.: 591,039

[22] Filed: Jan. 25, 1996

[30] Foreign Application Priority Data

Jan. 25, 1995 [JP] Japan .................................. 7-009566
Oct. 16, 1995 [JP] Japan .................................. 7-267378

[51] Int. Cl.[6] .................................................. B32B 27/00
[52] U.S. Cl. .................. 428/423.7; 428/364; 522/109; 522/142; 523/507; 525/175; 525/176; 528/271; 528/272
[58] Field of Search .................. 428/364, 423.7, 428/398, 475.8; 528/271, 272; 8/115.63, 115.6, 115.62; 427/400; 522/109, 142; 525/175, 176; 523/501; 524/171, 288, 289, 293

[56] References Cited

U.S. PATENT DOCUMENTS 3,779,881 12/1973 Sakurada et al. ................ 525/175
4,921,890 5/1990 Hayashi et al. .................. 523/507

*Primary Examiner*—Terressa Mosley
*Attorney, Agent, or Firm*—Austin R. Miller

[57] ABSTRACT

The present specification discloses a hygroscopic polyester copolymer with a hydrophilic compound copolymerized, containing a cross-linking agent and controlled in moisture absorbing and releasing property, and a fiber using the polyester copolymer. The fiber can be used as a comfortable material for underwear, sports wear, interlinings, etc. as highly hygroscopic woven and knitted fabrics, etc. of high quality.

43 Claims, 1 Drawing Sheet

HYGROSCOPIC POLYESTER COPOLYMER, AND A HYGROSCOPIC FIBER MADE THEREFROM

TECHNICAL FIELD

The present invention relates to a hygroscopic polyester copolymer and a fiber made therefrom in more detail, a fiber which can be ideally used especially as a clothing material for innerwear, intermediate wear, sports wear, etc.

BACKGROUND OF THE INVENTION

Thermoplastic synthetic fibers, typically polyester and polyamide fibers, are widely used mainly for clothing and industrial applications since they are excellent in mechanical intensity, chemical resistance, heat resistance, etc. However, these synthetic fibers are very low in hygroscopicity, and if they are used in direct contact with or near the skin as innerwear, intermediate wear, sports wear, etc., they are inferior to natural fibers in the feeling of comfortableness since perspiration from the skin makes the wearer feel stuffy and sticky. So, they are restrictively applied in clothing. To overcome the disadvantage, for example, Japanese Patent Publication No. 60-475, Japanese Utility Model Publication No. 60-40612 and Japanese Patent Laid-Open No. 60-215835 proposed attempts to obtain a hygroscopic and comfortable fabric using a combined yarn, twisted union yarn or paralleled yarn respectively consisting of fibers high in equilibrium moisture regain (coefficient of moisture absorption) and synthetic fibers. These methods certainly improve the feeling of comfortableness to some extent, but are not sufficient in effect, having such disadvantages that the disperse dye generally used for dyeing synthetic fibers contaminates the fibers high in equilibrium moisture regain, that isochroism is poor, and that stress stretch, etc. are lowered to lose the physical properties peculiar to synthetic fibers.

It is also known that polyester fibers can be made hygroscopic, by graft-polymerizing acrylic acid or methacrylic acid to polyester fibers and substituting the carboxyl groups of the graft polymer by an alkali metal (Japanese Patent Laid-Open No. 63-85163), but the method is not practically applied because polyesters do not allow easy graft polymerization and because color fastness, light fastness, physical properties of fibers, touch, etc. potentially tend to be lowered.

Methods of giving hygroscopicity in the stage of after processing cause various problems during dyeing or in view of the properties of the fabric obtained. So, to give hygroscopicity in the stage of fiber production for solving the above problems, a conjugated fiber of sheath-core type using a hygroscopic resin of 10% or more in the coefficient of moisture absorption at ordinary humidity as the core component and a polyester as the sheath component was proposed in Japanese Patent Laid-Open No. 2-99612. However, this method has a disadvantage that the hygroscopic resin used as the core component absorbs water, to be greatly swollen for cracking the surface of the fiber, and flows out due to its high solubility in water, during hot water treatment such as scouring and dyeing.

So, Japanese Patent Laid-Open No. 4-108113 proposed a sheath-core type conjugated fiber of 20/80 to 70/30 in core/sheath ratio, with the core in contact with a hollow portion formed in the conjugated fiber. However, since the core component is a hydrophilic polymer not cross-linked, the physical properties (strength-elongation characteristic) of the fiber are liable to change with the lapse of time disadvantageously. Japanese Patent Laid-Open No. 6-136620 proposed to prepare a hollow fiber by treating a sheath-core type conjugated fiber by hot water, but in this method, since the core component is also a hydrophilic polymer not cross-linked, the physical properties (strength-elongation characteristic) of the fiber are liable to change with the lapse of time disadvantageously. Japanese Patent Laid-Open No. 51-136924 proposed a sheath-core type conjugated staple fiber with a hydrophilic polyester as the core component and a non-hydrophilic polyester as the sheath component. The hydrophilic polyester used is a polyalkylene glycol copolymer or a polyalkylene glycol copolymer mixed with sulfonic acid or acid phosphoric ester derivative, and it is intended to increase both the ends of the staple fiber for enhancing water absorbability. However, the present inventors found that even though the staple fiber is improved in water absorbability, it is not improved in moisture absorbability.

Japanese Patent Laid-Open No. 53-111116 proposed an antistatic conjugated fiber of sheath-core type with a specific polyether ester as the core component. However, the intended effect is to make the fiber antistatic, and since a polyester obtained by copolymerizing a polyalkylene glycol alone is used as the core component, the physical properties (strength-elongation characteristic) of the fiber change with the lapse of time disadvantageously. Furthermore, the polyether ester is remarkably colored, to impair the quality of the final product obtained disadvantageously.

Japanese Patent laid-Open No. 52-55721 proposed a conjugated fiber with a fiber formable non-hydrophilic polymer as the sheath component, a hydrophilic polymer as the core component, and a continuous void in the core and/or between the core and the sheath along the fiber axis. However, since a hydrophilic polymer not cross-linked is used as the core component, the physical properties of the fiber change with the lapse of time disadvantageously as in the above mentioned prior art.

Japanese Patent Laid-Open No. 62-267352 disclosed a polyester composition containing 50 to 70 wt % of a specific polyalkylene glycol. The fibers made of the composition are low in physical properties (strength and elongation) and also poor in color fastness, and so cannot be used for clothing and industrial applications.

Japanese Patent Laid-Open No. 6-123012 disclosed a sheath-core type hygroscopic polyester fiber. This fiber uses a polymer obtained by blending a block polyether ester with a polyester obtained by copolymerizing an alkylene sulfoisophthalate and a polyoxyalkylene glycol, as the core component. However, since the amount of the copolymerized polyalkylene glycol in the core component of the conjugated fiber is too small to obtain sufficient hygroscopicity.

Japanese Patent Laid-Open Nos. 53-99296, 58-138753 and 61-36107 disclosed polyether esters using bisphenol A-ethylene oxide addition product. However, these copolymers are low in hygroscopicity, and since the synthetic fibers using this polymer change in physical properties with the lapse of time, for example, easily decline in elongation, troubles are liable to occur during weaving and knitting unpractically.

The object of the present invention is to provide a hygroscopic yarn high in commercial value which uses a polyester copolymer high in the coefficient of moisture absorption and has a specific moisture absorbing and releasing characteristic, for overcoming the problems of the prior art.

SUMMARY OF THE INVENTION

The above object of the present invention can be achieved by a polyester copolymer, comprising a hydrophilic compound (A) copolymerized by 40 to 99 wt % based on the total weight of the polyester copolymer, and a cross-linking agent (B), and being 12% or more in moisture absorption and release parameter (ΔMR) and by a fiber made therefrom.

Figure 1:
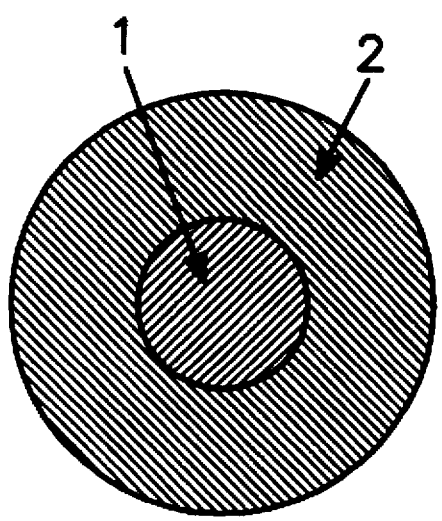
FIG. 1 is a sectional view showing a preferable sheath-core type conjugated yarn of the present invention.
Figure 2:
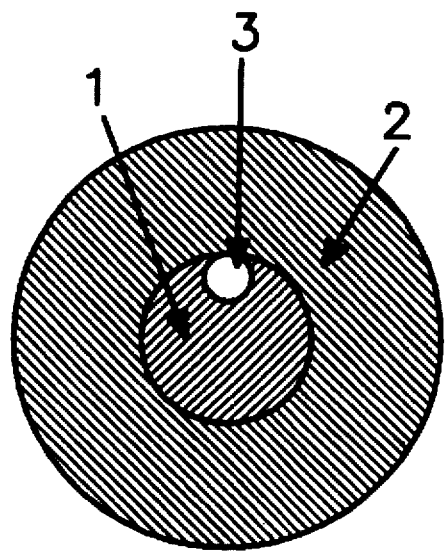
FIG. 2 is a sectional view showing a sheath-core type conjugated hollow yarn of the present invention.
Figure 3:
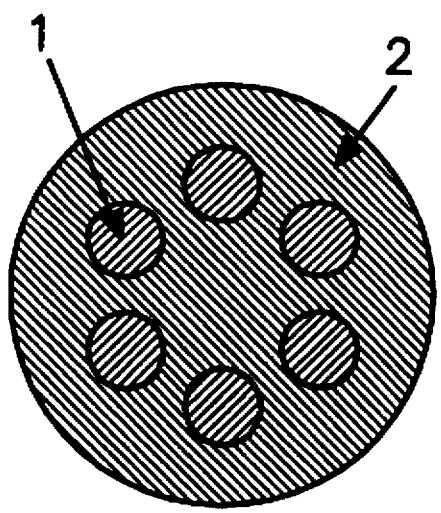
FIG. 3 is a sectional view showing a sea-land type conjugated yarn of the present invention.
Figure 4:
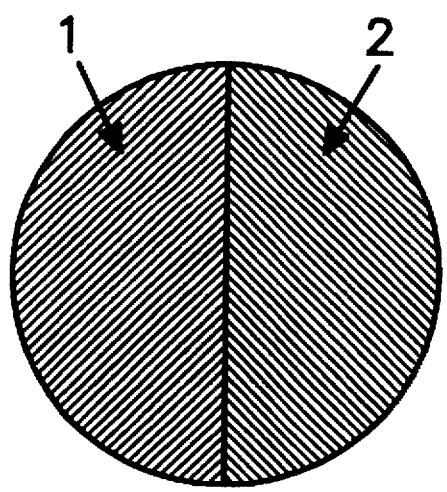
FIG. 4 is a sectional view showing a stick-together type yarn.

The symbols in the respective drawings denote the following:

1: polyester copolymer
2: fiber formable polyester
3: hollow portion

The Most Preferable Embodiments of the Invention

The acid component of the polyester copolymer can be one or more selected from aromatic dicarboxylic acids such as terephthalic acid, isophthalic acid, and naphthalene-2,6-dicarboxylic acid, and aliphatic dicarboxylic acids such as adipic acid and sebacic acid. In view of heat resistance and good fiber formability, terephthalic acid is especially preferable. The glycol component can be one or more selected from ethylene glycol, propylene glycol, tetramethylene glycol, diethylene, glycol, neopentyl glycol, etc. In view of heat resistance and good fiber formability, ethylene glycol is especially preferable.

The polyester copolymer of the present invention has a hydrophilic compound (A) copolymerized, to be hygroscopic, and as an auxiliary component to further enhance hygroscopicity and also to stabilize the physical properties of the fiber, a cross-linking agent (B) is further contained.

The amount of the hydrophilic compound (A) copolymerized in the polyester copolymer should be 40 to 99 wt %, preferably 50 to 95 wt %, more preferably 55 to 90 wt % based on the total weight of the polyester copolymer in view of hygroscopicity and spinnability.

The moisture absorption and release parameter (hereinafter written as ΔMR) showing the moisture absorbing and releasing characteristic of the polyester copolymer is recommended to be preferably higher for making the synthetic fiber made from it more hygroscopic. The polyester copolymer of the present invention should be 12% or more, preferably 15% or more, more preferably 18% or more in ΔMR.

Realistically ΔMR is 80% or less, and in view of stable physical properties of the yarn, it is recommended to be preferably 70% or less.

The ΔMR refers to the difference (ΔMR(%)=MR2−MR1) obtained by subtracting the coefficient of moisture absorption (MR1) at 20° C. and 65% RH from the coefficient of moisture absorption (MR2) at 30° C. and 90% RH. The ΔMR is an indicator of driving force for ensuring the feeling of comfortableness by releasing the moisture in the worn clothes into open air, and is the difference between the coefficient of moisture absorption at 30° C. and 90% RH simulating the temperature and humidity in the clothes caused by execution of light to medium work or light to medium motion and the coefficient of moisture absorption at 20° C. and 65% RH simulating the temperature and humidity of open air. The ΔMR is a reasonable indicator for the feeling of comfortableness of worn clothes, and a higher ΔMR value means a higher moisture absorbing and releasing capability, hence better feeling of comfortableness when a fabric is worn.

For further enhancing the ΔMR, the hydrophilic compound (A) is preferably 600 to 20000, more preferably 2000 to 10000, further more preferably 3000 to 9000 in number average molecular weight.

The hydrophilic compound (A) is not especially limited as far as it contains one or more ester formable groups and can be copolymerized with the polyester, and can be typically selected from polyoxyalkylene compounds, polyoxazolines, polyacrylamide and its derivatives, polysulfoethyl methacrylate, poly(meth)acrylic acid and its salts, polyhydroxyethyl (meth)acrylate, polyvinyl alcohol, and polyvinyl pyrrolidone. Among them, polyoxyalkylene compounds are preferable in view of compatibility with the polyester. The polyoxyalkylene compounds include polyoxyethylene compounds, polyoxypropylene compounds, polyoxytetramethylene compounds, etc. Above all, polyoxyethylene compounds are preferable, and especially polyethylene glycol is preferable since it is large in the effect of enhancing hygroscopicity.

Furthermore, as the polyoxyalkylene compound such as polyethylene glycol, polyethylene glycol with a crystallization inhibitor component is preferable since its compatibility with the polyester is higher. In this case, the crystallization inhibitor component refers to organic residues existing in the molecular chains or at the terminals, to disturb the symmetry of the repeated unit of polyethylene glycol. The inhibition of crystallization means that the melting point obtained by differential scanning calorimetry (DSC, temperature rise rate 16° C./min) becomes lower than the melting point of polyethylene glycol with the same molecular weight. Concrete compounds include derivatives of polyethylene glycol represented by the following formula (I)

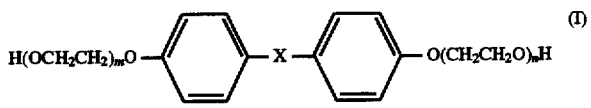

(where X stands for —CR₁R₂— (R₁ and R₂ stand for, respectively independently, a hydrogen atom or alkyl group), —SO₂—, —O—, —S— or —C(O)—; and n and m, an integer of 10≦n+m≦450 respectively). A compound with ethylene oxide (EO) added to bisphenol A or bisphenol S, etc. is preferable in view of higher compatibility with the polyester.

It is preferable in view of heat resistance that any of these compounds is mostly copolymerized in the polyester, but some of it may also be dispersed in the polymer.

Moreover, the polyester copolymer of the present invention contains the cross-linking agent (B). The cross-linking agent is not especially limited if it can react with the polyester, to form a cross-linked structure, but the use of a polyfunctional compound represented by the following formula

(where R₃ stands for a trivalent to hexavalent organic residue; R₄, a hydrogen atom or acetyl group; R₅, a hydrogen atom or alkyl group; and 3≦m+n≦6) is preferable since the reactivity with the polyester can be easily controlled.

Containing the cross-linking agent also includes that it is partially dispersed in the polyester, and at least some of the functional groups react to have a cross-linked structure which inhibits the change of the yarn with the lapse of time. The cross-linking agent can be preferably selected from polyfunctional carboxylic acids such as trimellitic acid, and pyromellitic acid, polyols such as glycerol, trimethylolpropane, and pentaerythritol in view of the color tone of the polymer. Trimellitic acid is especially preferable. Since the cross-linking agent (B) is contained, the polymer is further higher in hygroscopicity, and a cross-linked structure is formed in the polymer to exhibit an effect that the yarn obtained from it is hard to change in physical properties with the lapse of time.

The amount of the cross-linking agent in the polyester copolymer is preferably 0.01 to 30 mol %, more preferably 0.5 to 15 mol %, further more preferably 1 to 10 mol % based on the amount of the acid component of the entire polyester. If the amount is in this range, higher hygroscopicity, good spinnability and improved physical properties such as strength of the yarn can be preferably secured.

To further enhance the hygroscopicity of the polyester copolymer, the polyester copolymer can contain a compound with one or more polar groups which can be selected, for example, from derivatives of amino group, sulfonic acid group, carboxyl group, hydroxyl group, amide group, phosphonic acid group, etc. Containing in this case means dispersion in the polyester or copolymerization with the polyester.

The melt viscosity of the polyester copolymer of the present invention is preferably 500 to 5000 poises, more preferably 600 to 3000 poises, further more preferably 800 to 2000 poises, when measured at 280° C. at a shear rate of 50 cm$^{-1}$. If the melt viscosity is in this range, the flow during conjugated spinning, for example, is stable to allow spinning without yarn breaking.

Furthermore, the polyester copolymer of the present invention has hygroscopically swelling capability. Considering color fastness, the degree of hygroscopic swelling is recommended to be preferably 1.2 to 3.2 times, more preferably 1.5 to 3.0 times in 20° C. water. If the degree of hygroscopic swelling is in this range, the sheath-core type conjugated yarn obtained, for example, is preferably stable in form and hard to cause sheath cracking. To keep the degree of hygroscopic swelling in this range, for example, the phase separated state, etc. of the polyester copolymer is selected properly.

The polyester copolymer can, of course, contain a pigment such as titanium oxide or carbon black, surface-active agent such as alkylbenzenesulfonic acid, known antioxidant, anticoloring agent, light resisting agent, antistatic agent, etc. as far as the object of the present invention is not impaired.

The polyester copolymer of the present invention can be used as a fiber component such as a conjugated component or blended component, together with a fiber formable polymer, to obtain a highly hygroscopic fiber not impaired in physical properties such as strength.

In the case of a fiber with the polyester copolymer of the present invention mixed with a fiber formable polymer, the amount of the polyester copolymer is recommended to be preferably 3 to 40 wt %, more preferably 5 to 35 wt %, further more preferably 7 to 30 wt % based on the total amount of the fiber. The lower limit of the amount is set for giving sufficient hygroscopicity, and the upper limit is set for preventing spinnability and physical properties of the fiber from declining.

The fiber formable polymer in the present invention can be selected from, though not limited to, polyolefins such as polyethylene and polypropylene, polyamides such as nylon 6 and nylon 66, and polyesters such as polyethylene terephthalate and polybutylene terephthalate. Above all, a polyester mainly composed of polyethylene terephthalate most generally used as synthetic fibers for clothes is preferable.

The synthetic fiber of the present invention can be a conjugated fiber of the sheath-core type, conjugated hollow fiber of sheath-core type, conjugated fiber of, the sea-land type, conjugated fiber of stick-together type the, or blended fiber, etc. The hygroscopic polyester of the present invention can be used as a conjugated component or blended component at an optional rate. The use of the hygroscopic polyester of the present invention as a conjugated core or land component is preferable in view of higher color fastness.

For example, when the polyester copolymer of the present invention is used as the core component in a sheath-core type conjugated fiber or sheath-core type conjugated hollow-fiber, the ratio by weight of core/sheath is recommended to be preferably 5/95 to 90/10, more preferably 7/93 to 50/50, further more preferably 10/90 to 30/70. The conjugating ratio can be optionally selected for applications with or without dyeing. The lower limit in the amount of the core is set for giving sufficient hygroscopicity, and the upper limit is set for preventing spinnability and physical properties of the fiber from declining.

It is preferable that a hollow portion exists at the interface between the core and the sheath. If the hollow portion exists, it can ease and absorb the swelling power of the hygroscopic polymer, to prevent the sheath cracking when the core is hygroscopically swollen. The hollow portion rate as an area rate of the hollow portion based on the cross sectional area of the fiber obtained from the outer form of the fiber is recommended to be preferably at least 1.4% or more, more preferably 1.8% or more, further more preferably 2.4% or more. In view of spinning stability, it is preferable that the hollow portion rate is 70% or less.

Also in a sea-land type conjugated fiber or a stick-together type conjugated fiber, the conjugating ratio of the polyester copolymer (by weight) is recommended to be preferably 5/95 to 90/10, more preferably 7/93 to 50/50, further more preferably 10/90 to 30/70. The conjugating ratio can be optionally selected for applications with or without dyeing. The lower limit of the conjugating ratio is set for giving sufficient hygroscopicity, and the upper limit is set for preventing spinnability and physical properties of the fiber from declining. Furthermore, the sea-land type conjugated fiber and the stick-together type conjugated fiber can also have a hollow portion at any optional place, but it is preferable that the hollow portion exists at the interface between sea and land or at the interface between the components stuck together. In each case, the hollow portion rate as an area rate of the hollow portion based on the cross sectional area of the fiber obtained from the outer form of the fiber is recommended to be preferably at least 1.4% or more, more preferably 1.8% or more, further more preferably 2.4% or more. In view of spinning stability, it is preferable that the hollow portion rate is 70% or less.

To obtain the practical wearing comfortableness, the AMR of the fiber is recommended to be as high as possible, preferably 1.0% or more, more preferably 1.5% or more, further more preferably 2.0% or more.

In the present invention, the component which is conjugated or blended with the fiber formable polymer is said polyester copolymer, but as far as the effect is not impaired, the fiber can also contain a polyolefin, polyamide, polyester or polycarbonate, etc.

The fiber formable polymer can, of course, contain a pigment such as titanium oxide or carbon black, and also any known antioxidant, anticoloring agent, light resisting material, antistatic agent, etc. to suit each object.

In the present invention, the conjugated fiber consisting of a fiber formable polymer and the polyester copolymer of the present invention can be produced by any known method. A typical method for preparing a sheath-core type conjugated fiber is described below.

For example, in the case of a sheath-core type conjugated fiber, a polyester (sheath) and the polyester copolymer of the present invention (core) are melted separately, and introduced into a spinning pack, to form a sheath-core conjugated flow in a die, which is spun out of a discharge opening.

The spun filament yarn is taken up at a predetermined speed, and once wound as a package, and the undrawn yarn obtained is drawn by an ordinary drawing machine. For this drawing, the spun yarn can be directly continuously drawn without being wound after having been taken up, or can be taken up at a high speed of 4000 m/min or more, to make a yarn with desired performance all at once without being substantially drawn. For directly drawing after spinning, for example, the spun yarn can be taken up at 1000 to 5000 m/min and in succession dram and thermally set at 3000 to 6000 m/min.

The sectional form of the fiber of the present invention is not limited to a circle, and can also be a special form such as a triangle, flat or multi-leaf. Moreover, the fiber can be either a filament or staple fiber, which can be properly selected to suit each application. The fabric can be a woven fabric, knitted fabric or nonwoven fabric, etc. which can be properly selected to suit each object.

EXAMPLES

The present invention is described below in more detail in reference to examples. In the examples, the respective property values were obtained according to the following methods.

A. Intrinsic viscosity [η] of polyester obtained as o-chlorophenol solution at 25° C.

B. Moisture absorption and release parameter (ΔMR) of polyester copolymer or fiber using it In the case of a polymer, 1 g of a chip was cut into an about 2 mm cube to make a sample, and in the case of a yarn, 1 to 3 g of a raw yarn or cloth was used as a sample. The absolute dry weight of the sample was measured. The sample was allowed to stand in a thermo-hygrostat (PR-2G produced by Tabai) at 20° C. and 65% RH or at 30° C. and 90% RH for 24 hours, and weighed. The coefficient of moisture absorption was obtained from the following formula:

Coefficient of moisture absorption (%)=(Weight after moisture absorption−Absolutely dry weight)/Absolutely dry weight×100

From the coefficient of moisture absorption measured after treatment at 20° C. and 65% RH and that at 30° C. and 90% RH (respectively expressed as MR1 and MR2), the moisture absorption coefficient difference ΔMR (%)=MR2−MR1 was obtained. If the polyester copolymer is higher in ΔMR, the hygroscopicity of the yarn can be more efficiently enhanced preferably. So, the following criterion was used:

ΔMR≧18 ... ○

12≦ΔMR<18 ... Δ

ΔMR<12 ... x

C. Melt Viscosity of Polyester Copolymer

A polyester copolymer was dried in a vacuum at 130° C. for 12 hours, and the melt viscosity was measured by a melt indexer produced by Takara Kogyo, at a load of 325 g, 280° C. and a shear rate of 50 $cm^{-1}$.

D. Degree of hygroscopic swelling

A polyester copolymer chip was dried in a vacuum at 130° C. for 12 hours, accurately weighed, and put into a container filled with water. After 24 hours, the chip with water absorbed was weighed, and the ratio of the chip weight after water absorption to the chip weight before Water absorption was obtained from the following formula as the degree of hygroscopic swelling.

Degree of hygroscopic swelling=Chip weight after water absorption/Chip weight before water absorption E. Spinnability Spinning was effected for 3 hours under the conditions stated in Example 1. The following criterion was used:

No yarn breaking ... ○

1 time of yarn breaking ... Δ

2 or more times of yarn breaking ... x

F. Strength and elongation

A Tensilon tensile testing machine produced by Toyo Baldwin Co., Ltd. was used, to obtain a stress-strain curve with the sample length as 20 cm at a tensile speed of 10 cm/min, and from the curve, the respective values were obtained.

G. Change of yarn with the lapse of time

A drawn yarn was allowed to stand at 20° C. and 70% RH for 1 month, and the strength-elongation characteristic stated in F was obtained, to be compared with that obtained immediately after drawing, to measure how much the elongation declined.

The following criterion was used:

Elongation declined by less than 8% ... ○

Elongation declined by 8% to less than 16% (for example, if the elongation declined from 40% to 32%, the declining rate is 8%) ... Δ

Elongation declined by 16% or more (for example, the elongation declined from 40% to 24% or less) ... x H. Hollow portion rate A section of a yarn was photographed at about 100 times magnification, and the photo was further enlarged by 100%. Optional 10 single yarns were selected, and the rate of the hollow portion to the entire section was calculated from the following formula based on the sectional area of the yarn obtained from the external form of the yarn, and the area of the hollow portion. Hollow portion rate (%)=(Area of hollow portion)/Area of entire section)×100

Example 1

A flask was charged with 188 parts of terephthalic acid dimethyl ester, 124 parts of ethylene glycol, 7.6 parts of trimethyl trimellitate (TMTM) and 0.4 part of tetrabutyl titanate, and while methanol was distilled away at 140° to 230° C., ester interchange reaction was effected. Then, an ethylene glycol solution containing 0.08 part of phosphoric acid trimethyl ester, and 582 parts of polyethylene glycol (PEG) of 6000 in molecular weight, 1.2 parts of Irganox 1010 (produced by Ciba Geigy) as an antioxidant, 0.8 part of silicone as a defoaming agent, and 0.4 part of tetrabutyl titanate were added to the reaction product, and polymerization was effected at a reduced pressure of 1.0 mm Hg at 250° C. for 4 hours, to obtain a polyester copolymer. The amount of polyethylene glycol copolymerized to the copolymer was 75 wt %. The ΔMR of the polyester copolymer obtained was 31.0% (M1=2.5%, M2=33.5%)

Furthermore, the melt viscosity (280°) of the polyester copolymer obtained was 1100 poises, and the degree of hygroscopic swelling was 2.8 times.

The polyester copolymer as the core component and polyethylene terephthalate of 0.70 in intrinsic viscosity as the sheath component were separately melted, and discharged from concentric sheath-core conjugating dies at a ratio by weight of core/sheath=15/85, to obtain an undrawn yarn. It was drawn and thermally treated to obtain a concentric sheath-core type conjugated yarn of 75 deniers and 24 filaments. The yarn was cylindrically knitted, and its ΔMR was measured and found to be 2.8%. It was also good in strength-elongation characteristic. It did not decline in elongation with the lapse of time.

Examples 2 through 7, and Comparative Example 1

In Examples 2 through 6, polyester copolymers were obtained as done in Example 1, with the polyethylene glycol copolymerization rate in the polyester copolymer kept constant, except that the amount of TMTM was changed. And in Example 7 a polyester copolymer was obtained as in Example 1 with the same composition, but the reaction time was short (3 Hrs.), so its melt viscosity was comparatively low. The elongation decrease of the yarn was 10%. In Comparative Example 1, spinnability was poor, and among the properties of the yarn, the elongation declined with the lapse of time (Table 1).

Examples 8 through 14, and Comparative Example 2

Polyester copolymers and polyester yarns were obtained as done in Examples 1 through 7 and Comparative Example 1, except that bisphenol A ethylene oxide (EO) addition product (BPA) of 6000 in molecular weight was used instead of polyethylene glycol in the polyester copolymer. In Comparative Example 2, spinnability was poor and the elongation declined with the lapse of time (Table 2).

Examples 15 through 21, and Comparative Example 3

Polyester copolymers and yarns were obtained as done in Examples 1 through 7 and Comparative Example 1, except that bisphenol sulfone (S), having a molecular weight of 6000, EO addition product (BPS) was used instead of polyethylene glycol in the polyester copolymer. In Comparative Example 3, spinnability was poor and the elongation declined with the lapse of time (Table 3). Examples 22 through 31, and comparative examples 4 and 5 Polyester copolymers were obtained as done in Example 1, except that the amount of TMTM was kept constant at 3 mol % and that polyethylene glycol was changed in molecular weight or copolymerized amount. Yarns were prepared as done in Example 1, and the properties of the yarns are shown in Table 4. When the amount of PEG copolymerized was smaller than 40 wt % (Comparative Example 4), sufficient moisture absorbability could not be obtained. When the amount of PEG copolymerized was larger than 99 wt % (Comparative Example 5), moisture absorbability was low, and when the polyester copolymer was processed into a fiber, yarn breaking occurred very often not allowing the intended conjugated fiber to be obtained, since the polyester copolymer was low in spinnability (Table 4).

Examples 32 through 36

The polyester copolymer obtained as the core component in Example 1 and the same polyethylene terephthalate of 0.70 in intrinsic viscosity used as the sheath component in Example 1 were separately melted, and from concentric sheath-core conjugating dies, undrawn yarns were obtained at five different core-sheath conjugating ratios. They were drawn and heat-treated to obtain concentric sheath-core type conjugated yarns of 75 deniers and 24 filaments respectively. The properties of the yarns are shown in Table 5. According to the increase of the core-sheath ratio, ΔMR increased, but the strength and elongation declined, while the elongation changed to some extent with the lapse of time (Table 5).

Examples 37 through 41

Sheath-core type conjugated hollow yarns (hollow portion rate 6%) of 75 deniers and 24 filaments respectively were obtained as done in Example 1, except that dies for forming a hollow portion at the interface between sheath and core were used. The properties of the yarns are shown in Table 6. According to the increase of the core-sheath ratio, ΔMR increased, but the strength and elongation declined, while the elongation changed to some extent with the lapse of time. The yarns were cylindrically knitted into fabrics which were dyed. They were good in fastness (Table 6).

Examples 42 through 46

The polyester copolymer obtained in Example 1 as the land component (18 land pieces) and polyethylene terephthalate of 0.70 in intrinsic viscosity as the sea component were separately melted, and from sea-land type conjugating dies, undrawn yarns were obtained at properly different land/sea ratios. They were drawn and heat-treated, to obtain sea-land type conjugated yarns of 75 deniers and 9 filaments respectively. The properties of the yarns are shown in Table 7. According to the increase of the core-sheath ratio, ΔMR increased, but the strength and elongation declined, while the elongation changed to some extent with the lapse of time (Table 7).

Examples 47 to 49

The polyester copolymer (A) obtained in Example 1 and polyethylene terephthalate (B) of 0.70 in intrinsic viscosity were separately melted and from stick-together type conjugating dies, undrawn yarns were discharged at stick-together ratios (by weight) of A/B-60/40, 50/50 and 40/60. They were drawn and heat-treated to obtain stick-together type conjugated yarns of 75 deniers and 24 filaments respectively. The properties of the yarns are shown in Table 8. They were high in ΔMR, strength and elongation (Table 8).

Examples 50 through 54

The polyester copolymer (A) obtained in Example 1 and polyethylene terephthalate (B) of 0.70 in intrinsic viscosity were melted and mixed in an extruder at properly different ratios by weight, and from circular dies, undrawn yarns were discharged. They were drawn and heat-treated to obtain polyester yarns of 75 deniers and 24 filaments respectively. The properties of the yarns are shown in Table 9. According to the increase of the blending ratio, ΔMR increased, but the strength and elongation declined while the elongation changed to some extent with the lapse of time (Table 9).

TABLE 1

| | Composition and hygroscopic properties of copolymer | | | | | Properties of yarn | | | | |
|---|---|---|---|---|---|---|---|---|---|---|
| | Amount of PEG copolymerized (wt %) | Amount of TMTM copolymerized (mol %) | ΔMR (%) | Evaluation | Melt viscosity (poises) | Spinnability | Strength (g/d) | Elongation (%) | ΔMR (%) | Change over time |
| Example 1 | 75 | 3 | 31.0 | ○ | 1100 | ○ | 4.2 | 40.2 | 4.2 | ○ |
| Example 2 | 75 | 1 | 30.6 | ○ | 1120 | ○ | 4.3 | 41.3 | 4.3 | ○ |
| Example 3 | 75 | 5 | 32.2 | ○ | 1080 | ○ | 4.2 | 40.4 | 4.1 | ○ |
| Example 4 | 75 | 12 | 31.2 | ○ | 1800 | ○ | 3.8 | 38.4 | 3.8 | ○ |
| Example 5 | 75 | 25 | 31.4 | ○ | 2120 | Δ | 3.4 | 36.5 | 3.8 | ○ |
| Example 6 | 75 | 40 | 30.2 | ○ | 2400 | Δ | 3.0 | 33.4 | 3.7 | ○ |
| Comparative example 1 | 75 | 0 | 30.3 | Δ | 200 | x | 4.2 | 42.0 | 3.8 | x |
| Example 7 | 75 | 3 | 29.0 | Δ | 310 | Δ | 4.2 | 41.2 | 3.9 | Δ |

Molecular weight of PEG: 6000

TABLE 2

| | Composition and hygroscopic properties of copolymer | | | | | Properties of yarn | | | | |
|---|---|---|---|---|---|---|---|---|---|---|
| | Amount of BPA copolymerized (wt %) | Amount of TMTM copolymerized (mol %) | ΔMR (%) | Evaluation | Melt viscosity (poises) | Spinnability | Strength (g/d) | Elongation (%) | ΔMR (%) | Change over time |
| Example 8 | 75 | 3 | 30.2 | ○ | 1120 | ○ | 4.2 | 40.2 | 4.1 | ○ |
| Example 9 | 75 | 1 | 31.6 | ○ | 1140 | ○ | 4.3 | 41.3 | 4.3 | ○ |
| Example 10 | 75 | 5 | 30.9 | ○ | 1080 | ○ | 4.2 | 40.4 | 4.2 | ○ |
| Example 11 | 75 | 12 | 31.7 | ○ | 1700 | ○ | 3.8 | 38.4 | 3.9 | ○ |
| Example 12 | 75 | 25 | 31.4 | ○ | 2180 | ○ | 3.4 | 36.5 | 3.8 | ○ |
| Example 13 | 75 | 40 | 31.2 | ○ | 2360 | Δ | 3.0 | 33.4 | 3.7 | ○ |
| Comparative example 2 | 75 | 0 | 30.0 | Δ | 220 | x | 4.2 | 41.0 | 4.0 | x |
| Example 14 | 75 | 3 | 29.0 | Δ | 360 | Δ | 4.0 | 39.0 | 3.9 | Δ |

Molecular weight of BPA: 6000

TABLE 3

| | Composition and hygroscopic properties of copolymer | | | | | Properties of yarn | | | | |
|---|---|---|---|---|---|---|---|---|---|---|
| | Amount of BPS copolymerized (wt %) | Amount of TMTM copolymerized (mol %) | ΔMR (%) | Evaluation | Melt viscosity (poises) | Spinnability | Strength (g/d) | Elongation (%) | ΔMR (%) | Change over time |
| Example 15 | 75 | 3 | 29.0 | ○ | 1050 | ○ | 4.1 | 39.2 | 4.2 | ○ |
| Example 16 | 75 | 1 | 30.2 | ○ | 1100 | ○ | 4.2 | 40.3 | 4.3 | ○ |
| Example 17 | 75 | 5 | 31.2 | ○ | 1050 | ○ | 4.1 | 40.1 | 4.1 | ○ |
| Example 18 | 75 | 12 | 31.8 | ○ | 1850 | ○ | 3.7 | 38.4 | 3.7 | ○ |
| Example 19 | 75 | 25 | 30.4 | ○ | 2020 | ○ | 3.3 | 36.5 | 3.7 | ○ |
| Example 20 | 75 | 40 | 29.2 | ○ | 2520 | Δ | 3.0 | 31.4 | 3.7 | ○ |
| Comparative example 3 | 75 | 0 | 29.8 | Δ | 270 | x | 4.1 | 40.0 | 4.1 | x |
| Example 21 | 75 | 3 | 29.0 | Δ | 390 | Δ | 4.2 | 40.6 | 3.9 | Δ |

Molecular weight of BPS: 6000

TABLE 4

| | Composition and property | | | | Properties of yarn | | | |
|---|---|---|---|---|---|---|---|---|
| | Molecular weight of PEG | Amount of PEG copolymerized (wt %) | DMR (%) | Evaluation | Strength (g/d) | Elongation (%) | DMR (%) | Change over time |
| Comparative example 4 | 6000 | 35 | 10.5 | x | 4.1 | 40.4 | 1.4 | o |
| Example 22 | 6000 | 45 | 12.8 | Δ | 4.3 | 41.3 | 2.0 | o |
| Example 23 | 6000 | 55 | 24.7 | o | 4.1 | 40.6 | 3.7 | o |
| Example 24 | 6000 | 70 | 30.3 | o | 4.2 | 41.5 | 4.5 | o |
| Example 25 | 6000 | 93 | 28.6 | o | 4.2 | 40.2 | 4.2 | Δ |
| Comparative example 5 | 6000 | 99.5 | 8.6 | x | — | — | — | — |
| Example 26 | 400 | 75 | 12.3 | Δ | 4.2 | 40.1 | 1.9 | Δ |
| Example 27 | 1000 | 75 | 23.6 | o | 4.2 | 41.2 | 2.7 | o |
| Example 28 | 3000 | 75 | 26.1 | o | 4.2 | 40.5 | 4.2 | o |
| Example 29 | 5000 | 75 | 28.4 | o | 4.3 | 41.3 | 3.3 | o |
| Example 30 | 8000 | 75 | 30.0 | o | 4.2 | 40.4 | 1.9 | o |
| Example 31 | 24000 | 75 | 12.1 | Δ | 4.2 | 41.0 | 1.8 | o |

TMTM 3 mol %

TABLE 5

| | Properties of yarn | | | |
|---|---|---|---|---|
| | Core-sheath conjugating ratio | Strength (g/d) | Elongation (%) | ΔMR (%) | Change over time |
| Example 32 | 7/93 | 4.6 | 38.4 | 2.1 | o |
| Example 33 | 10/90 | 4.3 | 41.0 | 2.8 | o |
| Example 34 | 25/75 | 3.8 | 41.2 | 8.2 | o |
| Example 35 | 50/50 | 2.6 | 27.3 | 14.1 | Δ |
| Example 36 | 90/10 | 1.3 | 22.1 | 26.1 | Δ |

TABLE 6

| | Properties of yarn | | | |
|---|---|---|---|---|
| | Core-sheath conjugating ratio | Strength (g/d) | Elongation (%) | ΔMR (%) | Change over time |
| Example 37 | 7/93 | 4.5 | 41.4 | 2.2 | o |
| Example 38 | 10/90 | 4.3 | 40.6 | 2.7 | o |
| Example 39 | 25/75 | 3.6 | 39.6 | 8.4 | o |
| Example 40 | 50/50 | 2.5 | 28.5 | 14.0 | Δ |
| Example 41 | 90/10 | 1.2 | 22.4 | 25.6 | Δ |

TABLE 7

| | Properties of yarn | | | |
|---|---|---|---|---|
| | Land/Sea conjugating ratio | Strength (g/d) | Elongation (%) | ΔMR (%) | Change over time |
| Example 42 | 7/93 | 4.5 | 39.4 | 2.0 | o |
| Example 43 | 10/90 | 4.2 | 40.7 | 2.8 | o |
| Example 44 | 25/75 | 3.8 | 39.5 | 8.3 | o |
| Example 45 | 50/50 | 2.7 | 28.8 | 14.6 | Δ |
| Example 46 | 90/10 | 1.3 | 21.4 | 26.5 | Δ |

TABLE 8

| | Properties of yarn | | | |
|---|---|---|---|---|
| | A/B conjugating ratio | Strength (g/d) | Elongation (%) | ΔMR (%) | Change over time |
| Example 47 | 60/40 | 3.4 | 37.4 | 15.0 | o |
| Example 48 | 50/50 | 3.7 | 40.0 | 13.8 | o |
| Example 49 | 40/60 | 3.7 | 39.5 | 11.2 | o |

TABLE 9

| | Properties of yarn | | | |
|---|---|---|---|---|
| | A/B blending ratio | Strength (g/d) | Elongation (%) | ΔMR (%) | Change over time |
| Example 50 | 7/93 | 4.2 | 40.4 | 1.9 | o |
| Example 51 | 10/90 | 3.8 | 41.0 | 2.8 | o |
| Example 52 | 20/80 | 3.5 | 35.3 | 5.2 | o |
| Example 53 | 35/65 | 2.4 | 24.3 | 9.1 | Δ |
| Example 54 | 70/30 | 1.2 | 20.0 | 18.5 | Δ |

Industrial Utility

The polyester copolymer obtained in the present invention has very high hygroscopicity, and the yarn obtained from it has sufficient hygroscopicity to ensure wearing comfortableness, and also has dry touch, softness and high color fastness and light fastness. The fiber of the present invention is suitable for underwear, shirts, blouses, intermediate wear, sports wear, slacks, outer wear, interlinings, curtains, wall paper, and furthermore, bed sheets, bedquilt covers, fillings, etc. very highly practically.

We claim:

1. A hygroscopic fiber comprising:
   a fiber formable polymer, and
   a polyester copolymer comprising a hydrophilic compound (A) copolymerized by 40 to 99 wt % based on the total weight of the polyester copolymer, and a cross-linking agent (B),
   melt blended together, said polyester copolymer being 12% to 80% in moisture absorption and release parameter (ΔMR).

2. The fiber of claim 1, wherein the number average molecular weight of the hydrophilic compound (A) is 600 to 20000.

3. The fiber of claim 1, wherein the hydrophilic compound (A) is a polyoxyalkylene compound.

4. The fiber of claim 1, wherein the hydrophilic compound (A) is a polyoxyalkylene compound with a crystallinity inhibitor component.

5. The fiber of claim 4, wherein the polyoxyalkylene compound with a crystallinity inhibitor component is a polyethylene glycol derivative represented by the following formula (I):

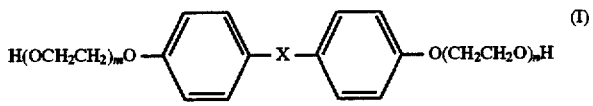

(where X stands for —CR₁R₂— (R₁ and R₂ stand for, respectively independently, a hydrogen atom or alkyl group), —SO₂, —O—, —S—, or —C(O)—; and n and m, an integer of 10≦n+m≦450 respectively).

6. The fiber of claim 1, wherein the cross-linking agent (B) is contained in the amount of 0.01 to 30 mol %.

7. The fiber of claim 1, wherein the cross-linking agent is a polyfunctional compound represented by the following formula (II):

(where R₃ stands for a trivalent to hexavalent organic residue; R₄, a hydrogen atom or acetyl group; R₅, a hydrogen atom or alkyl group; and 3≦m+n≦6).

8. The fiber of claim 1, wherein the melt viscosity measured at 280° C. at a shear rate of 50 cm⁴ is 500 to 5000 poises.

9. The fiber of claim 1, wherein the degree of hygroscopic swelling in 20° C. water is 1.2 to 3.2 times.

10. The fiber of claim 1, wherein the polyester copolymer is present in an amount of 3 to 40 wt % based on the total weight of the yarn.

11. A hygroscopic sheath-core conjugated fiber, comprising:
a fiber formable polymer as a sheath component, and
a hygroscopic polyester copolymer comprising a hydrophilic compound (A) copolymerized by 40 to 99 wt % based on the total weight of the polyester copolymer, and a crosslinking agent (B), melt blended together, said polyester copolymer being 12% to 80% in moisture absorption and release parameter (ΔMR), as a core component,
said fiber having a core/sheath conjugating ratio (wt %) of 5/95 to 90/10.

12. A hygroscopic sheath-core conjugated fiber, comprising:
a fiber formable polymer as a sheath component, and
a hygroscopic polyester copolymer comprising a hydrophilic compound (A) copolymerized by 40 to 99 wt % based on the total weight of the polyester copolymer, and a crosslinking agent (B), melt blended together, said polyester copolymer being 12% to 80% in moisture absorption and release parameter (ΔMR), as a core component,
said core component being in contact with a hollow portion provided in said conjugated fiber, and having a core/sheath conjugating ratio (wt %) of 5/95 to 90/10.

13. The sheath-core conjugated fiber of claim 12, wherein the hollow portion rate is 1.4% to 70%.

14. A hygroscopic sea-land conjugated fiber, comprising:
a fiber formable polymer as a sea component, and
a hygroscopic polyester copolymer comprising a hydrophilic compound (A) copolymerized by 40 to 99 wt % based on the total weight of the polyester copolymer, and a crosslinking agent (B), melt blended together, said polyester copolymer being 12% to 80% in moisture absorption and release parameter (ΔMR), as a land component, and having a sea/land conjugating ratio (wt %) of 5/95 to 90/10.

15. The hygroscopic sea-land conjugated fiber of claim 14, wherein the hollow portion rate is 1.4% to 70%.

16. A hygroscopic stick-together conjugated fiber, comprising:
95 to 10 wt % of a fiber formable polymer, and
5 to 90 wt % of a hygroscopic polyester copolymer comprising a hydrophilic compound (A) copolymerized by 40 to 99 wt % based on the total weight of the polyester copolymer, and a crosslinking agent (B), melt blended together, said polyester copolymer being 12% to 80% in moisture absorption and release parameter (ΔMR), in contact with a portion of said fiber formable polymer.

17. The hygroscopic stick-together conjugated fiber of claim 16, wherein the hollow portion rate is 1.4% to 70%.

18. The hygroscopic conjugated fiber of any one of claims 1, 11, 14 and 16, wherein the fiber formable polymer is a polyester.

19. The hygroscopic fiber of any one of claims 1, 11, 14 and 16, wherein the ΔMR of the fiber is 1.0% or more.

20. The fiber of claim 11, wherein the number average molecular weight of the hydrophilic compound (A) is 600 to 20000.

21. The fiber of claim 11, wherein the hydrophilic compound (A) is a polyoxyalkylene compound.

22. The fiber of claim 11, wherein the hydrophilic compound (A) is a polyoxyalkylene compound with a crystallinity inhibitor component.

23. The fiber of claim 13, wherein the polyoxyalkylene compound with a crystallinity inhibitor component is a polyethylene glycol derivative represented by the following formula (I):

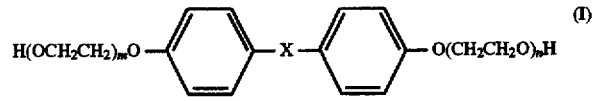

(where X stands for —CR₁R₂— (R₁ and R₂ stand for, respectively independently, a hydrogen atom or alkyl group), —SO₂, —O—, —S—, or —C(O)—; and n and m, an integer of 10≦n+m<450 respectively).

24. The fiber of claim 11, wherein the cross-linking agent (B) is contained in an amount of 0.01 to 30 mol %.

25. The fiber of claim 11, wherein the cross-linking agent is a polyfunctional compound represented by the following formula (II):

(where R₃ stands for a trivalent to hexavalent organic residue; R₄, a hydrogen atom or acetyl group; R₅, a hydrogen atom or alkyl group; and 3≦m+n≦6).

26. The fiber of claim 11, wherein the melt viscosity measured at 280° C. at a shear rate of 50 cm⁻¹ is 500 to 5000 poises.

27. The fiber of claim 11, wherein the degree of hygroscopic swelling in 20° C. water is 1.2 to 3.2 times.

28. The fiber of claim 14, wherein the number average molecular weight of the hydrophilic compound (A) is 600 to 20000.

29. The fiber of claim 14, wherein the hydrophilic compound (A) is a polyoxyalkylene compound.

30. The fiber of claim 14, wherein the hydrophilic compound (A) is a polyoxyalkylene compound with a crystallinity inhibitor component.

31. The fiber of claim 21, wherein the polyoxyalkylene compound with a crystallinity inhibitor component is a polyethylene glycol derivative represented by the following formula (I):

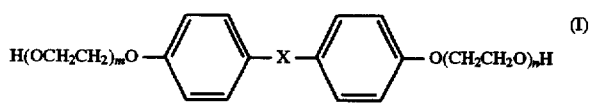

(where X stands for $-CR_1R_2-$ ($R_1$ and $R_2$ stand for, respectively independently, a hydrogen atom or alkyl group), $-SO_2$, $-O-$, $-S-$, or $-C(O)-$; and n and m, an integer of $10 \leq n+m \leq 450$ respectively).

32. The fiber of claim 14, wherein the cross-linking agent (B) is contained in an amount of 0.01 to 30 mol %.

33. The fiber of claim 14, wherein the cross-linking agent is a polyfunctional compound represented by the following formula (II):

(where $R_3$ stands for a trivalent to hexavalent organic residue; $R_4$, a hydrogen atom or acetyl group; $R_5$, a hydrogen atom or alkyl group; and $3 \leq m+n \leq 6$).

34. The fiber of claim 14, wherein the melt viscosity measured at 280° C. at a shear rate of 50 cm$^4$ is 500 to 5000 poises.

35. The fiber of claim 14, wherein the degree of hygroscopic swelling in 20° C. water is 1.2 to 3.2 times.

36. The fiber of claim 16, wherein the number average molecular weight of the hydrophilic compound (A) is 600 to 20000.

37. The fiber of claim 16, wherein the hydrophilic compound (A) is a polyoxyalkylene compound.

38. The fiber of claim 16, wherein the hydrophilic compound (A) is a polyoxyalkylene compound with a crystallinity inhibitor component.

39. The fiber of claim 38, wherein the polyoxyalkylene compound with a crystallinity inhibitor component is a polyethylene glycol derivative represented by the following formula (I):

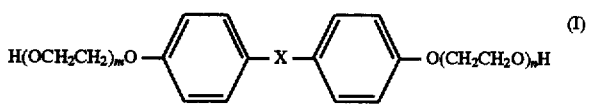

(where X stands for $-CR_1R_2-$ ($R_1$ and $R_2$ stand for, respectively independently, a hydrogen atom or alkyl group), $-SO_2$, $-O-$, $-S-$, or $-C(O)-$; and n and m, an integer of $10 \leq n+m \leq 450$ respectively).

40. The fiber of claim 16, wherein the cross-linking agent (B) is contained in an amount of 0.01 to 30 mol %.

41. The fiber of claim 16, wherein the cross-linking agent is a polyfunctional compound represented by the following formula (II):

(where $R_3$ stands for a trivalent to hexavalent organic residue; $R_4$, a hydrogen atom or acetyl group; $R_5$, a hydrogen atom or alkyl group; and $3 \leq m+n \leq 6$).

42. The fiber of claim 16 wherein the melt viscosity measured at 280° C. at a shear rate of 50 cm$^{31\ 1}$ is 500 to 5000 poises.

43. The fiber of claim 16, wherein the degree of hygroscopic swelling in 20° C. water is 1.2 to 3.2 times.

* * * * *

UNITED STATES PATENT AND TRADEMARK OFFICE
CERTIFICATE OF CORRECTION

PATENT NO. : 5,698,331
DATED : December 16, 1997
INVENTOR(S) : Yoshitaka Matsumura, Yuko Harashina, Tetsunori Higuchi and Tai Sasamoto It is certified that error appears in the above-indentified patent and that said Letters Patent is hereby corrected as shown below:

In Column 2, line 55, please change "61" to --6--.

In Column 6, line 63, please change "AMR" to --$\Delta$MR--.

In Column 7, line 67, please change "AMR" to --$\Delta$MR--.

In Column 15, line 33, please change "$cm^{1}$" to --$cm^{-1}$--.

In Column 16, line 39, please change "13" to --22--.

In Column 17, line 9, please change "21" to --30--; and line 32, please change "$cm^{1}$" to --$cm^{-1}$--.

In Column 18, line 32, please change "$cm^{31\ 1}$" to --$cm^{-1}$--.

Signed and Sealed this

Twenty-fourth Day of February, 1998

*Attest:*

BRUCE LEHMAN

*Attesting Officer*   *Commissioner of Patents and Trademarks*